United States Patent [19]
Ramirez de Agudelo et al.

[11] Patent Number: 4,729,980
[45] Date of Patent: Mar. 8, 1988

[54] CATALYST FOR THE SIMULTANEOUS HYDRODEMETALLIZATION AND HYDROCONVERSION OF HEAVY HYDROCARBON FEEDSTOCKS AND PROCESS FOR PREPARING THE CATALYST

[75] Inventors: M. M. Ramirez de Agudelo; C. E. Galarraga, both of Los Teques, Venezuela

[73] Assignee: Intevep, S.A., Caracas, Venezuela

[21] Appl. No.: 42,812

[22] Filed: Apr. 27, 1987

[51] Int. Cl.$^4$ .................... B01J 23/85; B01J 27/049
[52] U.S. Cl. .................... 502/221; 502/254; 502/309; 502/316
[58] Field of Search ............ 502/220, 221, 254, 255, 502/309, 314, 316

[56] References Cited

U.S. PATENT DOCUMENTS

| 4,082,695 | 4/1978 | Rosinski et al. | 502/314 X |
| 4,089,774 | 5/1978 | Oleck et al. | 502/314 X |
| 4,666,878 | 5/1978 | Jacobson et al. | 502/221 |

Primary Examiner—W. J. Shine
Attorney, Agent, or Firm—Bachman & LaPointe

[57] ABSTRACT

An improved catalyst for use in the hydrodemetallization and hydroconversion of heavy hydrocarbon feedstocks and method of making same and, more particularly, an improved catalyst having two distinct phases supported on a refractory support wherein the first phase effectively stores metals removed from the feestock and the second phase exhibits superior catalytic activity for hydrogenation when processing heavy hydrocarbon feedstocks.

10 Claims, No Drawings

CATALYST FOR THE SIMULTANEOUS HYDRODEMETALLIZATION AND HYDROCONVERSION OF HEAVY HYDROCARBON FEEDSTOCKS AND PROCESS FOR PREPARING THE CATALYST

BACKGROUND OF THE INVENTION

The present invention is drawn to an improved catalyst for use in the hydrodemetallization and hydroconversion of heavy hydrocarbon feedstocks and method of making same and, more particularly, an improved catalyst having two distinct phases supported on a refractory support wherein the first phase effectively stores metals removed from the feedstock and the second phase exhibits superior catalytic activity for hydrogenation when processing heavy hydrocarbon feedstocks.

Heretofore, operations such as hydrotreatment of heavy hydrocarbons are performed in the presence of catalysts comprising elements of Group VIII and Group VIB supported on a refractory oxide support. These types of catalysts suffer from a number of disadvantages. For example, during the hydrotreatment of heavy feedstocks the life of most of the conventional catalyst is shortened by a fast deactivation. The first cause for the deactivation is the deposition of coke on the catalyst. Coke deposits can be avoided by improving the hydrogenation activity of the catalyst. The second cause for the deactivation results from metal deposits on the catalyst.

Most of the patents related to improved demetallization catalysts deal with special designs of the catalyst pore size distribution. It has been found in the prior art that a catalyst having a macropore structure can generally accumulate higher amounts of metals. In order to achieve this macropore structure several approaches have been considered in the prior art. One of these is to vary the form and size of the catalyst particles and the surface area and the porosity of the catalyst support. The following patents are examples. U.S. Pat. Nos. 4,014,821, 4,082,695, 4,102,822, 4,297,242, 4,328,127, 4,351,717, 4,411,771, 4,414,141. The optimum pore structure appears to be well known in the previous art. Having established the optimum pore structure, the next step would be to optimize the chemical formulation and composition of the catalyst.

Patents which deal with variations in the chemical composition and formulation are as follows: U.S. Pat. Nos. 3,898,155, 3,931,052, 3,985,684, 4,344,867 and G.B. Pat. No. 2,032,795. The first three patents consider the inclusion of a third element besides the Group VIB and Group VIII elements in the catalyst. U.S. Pat. No. 4,344,867 is concerned with a chemical treatment of a catalyst support. The G.B. Pat. No. 2,032,795 patent eliminates the Group VIB element from the composition and introduces a method of core inpregnation for the preparation of the catalyst. All of these patents however are based on the fact that larger pores can accumulate higher amounts of metals. Thus, while some improvement in demetallization may be accomplished employing these catalyst, the increase in demetallization is generally accompanied by a loss in hydrogenation activity.

Accordingly, it is the principal object of the present invention to provide a catalyst and method for making same which exhibits good simultaneous demetallization and hydrogenation activity when processing heavy hydrocarbon feeds.

It is a particular object of the present invention to provide a catalyst and method for making same as set forth above having two distinct metal phases deposited on a refractory support.

It is a further object of the present invention to provide a catalyst and method for making same as set forth above wherein the first phase is a demetallization phase and the second phase is a hydrogenation phase.

It is a still further object of the present invention to provide a catalyst and method for making same as set forth wherein the weight ratio of the phases as measured by mossbauer spectrum are controlled.

Further objects and advantages of the present invention will appear hereinbelow.

SUMMARY OF THE INVENTION

In accordance with the present invention the foregoing objects and advantages are readily obtained.

The present invention is drawn to an improved catalyst for use in the hydrodemetallization and hydroconversion of heavy hydrocarbon feedstocks and method of making same and, more particularly, an improved catalyst having two distinct phases supported on a refractory support wherein the first phase effectively stores metals removed from the feedstock and the second phase exhibits superior catalytic activity for hydrogenation when processing heavy hydrocarbon feedstocks. The catalyst of the present invention comprises a refractory support having a first demetallization phase and a second hydrogenation phase supported thereon, the first demetallization phase being selected from the group consisting of iron oxide, iron sulphide and mixtures thereof and the second phase being selected from the group consisting of iron-Group VIB metal oxides, iron-Group VIB sulphides and mixtures thereof wherein the weight ratio of the first phase to the second phase as measured by mossbauer spectrum is from about 0.1 to 8.0, the iron is present in an amount of from about 4 to 20 wt.% and the Group VIB metal is present in an amount of from about 0.1 to 8 wt.% wherein the atomic ratio of iron to Group VIB metal is from about 0.3 to 20. In accordance with a preferred embodiment of the present invention, the refractory support is selected from the group consisting of alumina, silica, titania and mixtures thereof and has the following pore size distribution:

$\leq 90$ Å diameter: between 0–10% pore volume
90–300 Å diameter: between 20–85% pore volume
300–500 Å diameter: between 5–20% pore volume
$\geq 500$ Å diameter: between 0–10% pore volume.

The method for preparing the catalyst comprises providing a refractory support structure, first impregnating the refractory support structure with an acid iron nitrate solution so as to obtain a composition of from about 4 to 20 wt.% iron on the final catalyst, filtering, drying and calcining the impregnated support, second impregnating the filtered, dried and calcined iron impregnated support with a solution containing a Group VIB metallic component so as to obtain a composition of from about 0.1 to 8 wt.% Group VIB metallic component on the final catalyst, and filtering, drying and calcining the impregnated support. The process for treating heavy hydrocarbon feedstocks with the catalyst of the present invention comprises contacting the feedstock with the catalyst of the present invention at a temperature of from about 150° to 500° C., at a pressure of from about 30 to 250 atomospheres and LHSV of from about 0.1 to 25 h$^{-1}$ in a reactor.

The catalyst of the present invention is capable of storing metals removed from the heavy hydrocarbon feedstock in the demetallization phase supported on the refractory support. The iron oxide and/or iron sulphide phase can store large amounts of metals without metal accumulating into the pores thereby avoiding structural change and correspondingly a decrease in activity. The catalyst offers superior simultaneous demetallization and hydrogenation over catalysts heretofore known.

DETAILED DESCRIPTION

Effective simultaneous demetallization and hydrogenation of a heavy hydrocarbon feedstock can be accomplished when employing the catalyst of the present invention. The term "demetallization" as used herein refers to the elimination of at least 70% of the metals in the heavy feedstock as effected by passing the feedstock through a reaction zone containing the catalyst of the present invention.

The catalyst of the present invention comprises a refractory support having a first demetallization phase and a second hydrogenation phase supported thereon, the first demetallization phase being selected from the group consisting of iron oxide, iron sulphide and mixtures thereof and the second phase being selected from the group consisting of iron-Group VIB metal oxides, iron-Group VIB sulphides and mixtures thereof wherein the weight ratio of the first phase to the second phase as measured by mossbauer spectrum is from about 0.1 to 8.0, the iron is present in an amount of from about 4 to 20 wt.% and the Group VIB metal is present in an amount of from about 0.1 to 8 wt.% wherein the atomic ratio of iron to Group VIB metal is from about 0.3 to 20. In accordance with a preferred embodiment of the present invention the iron and Group VIB metal are present in an amount of from about 4 to 20 wt.% and 1.0 to 5.0 wt.%, respectively, wherein the atomic ratio of iron to Group VIB metal is from about 0.6 to 5.0. The first phase in the preferred embodiment contains from about 30 to 85 wt.%, and preferably 30 to 70 wt.% of the total iron content of the final catalyst and, when in the form of an iron sulphide, should have a crystalline structure selected from the group consisting of the cubic system, the hexagonal system, the monoclinic system and mixtures thereof. The crystalline structure of the first phase is important only when the phase is iron sulphide. If the phase is iron oxide, crystalline structure is immaterial. This is because iron oxide is a precursor which would yield iron sulfide under reaction conditions. The second phase preferably contains a crystalline structure of the cubic system and the atomic ratio of iron to Group VIB metal is from about 0.8 to 3.0. The preferred refractory support is selected from the group consisting of alumina, silica, titania and mixtures thereof and has the following pore size distribution:

≦90 Å diameter: between 0–10% pore volume
90–300 Å diameter: between 20–85% pore volume
300–500 Å diameter: between 5–20% pore volume
≧500 Å diameter: between 0–10% pore volume.

In order to obtain the two phases on the refractory support in the final catalyst it is critical that the support first be impregnated with iron and thereafter impregnated with the Group VIB metal. The method of the present invention comprises providing a refractory support structure, first impregnating the refractory support structure with an acid iron nitrate solution so as to obtain a composition of from about 4 to 20 wt.% iron on the final catalyst, filtering, drying and calcining the impregnated support, second impregnating the filtered, dried and calcined iron impregnated support with a solution containing a Group VIB metallic component so as to obtain a composition of from about 0.5 to 8 wt.% Group VIB metallic component on the final catalyst, and filtering, drying and calcining the impregnated support. The foregoing process results in two phases being deposited on the refractory surface, the first phase being iron oxide and the second phase being iron-Group VIB oxides. If desired, the resultant catalyst can be presulphided so as to form iron sulphide and iron-Group VIB sulphide by presulphiding is at a temperature of about 250° to 450° C., a pressure of about 1 and 150 atmospheres in an H$_2$/H$_2$S atmosphere containing between 5 to 15 wt.% H$_2$S.

The first demetallization phase has been characterized by its x-ray diffraction pattern and its mossbauer spectrum. The x-ray diffraction pattern of the first phase is used for the determination of the crystal structure of the precursor iron oxide or the iron sulphide which is present in the presulphided catalysts. It has been found that only crystals of iron sulfides of the hexagonal, cubic or monoclinic system can store the metals removed from the oil without loss in stability because they present cation vacancies which can lodge the metal cations from the crude oil.

The mossbauer spectrum allows to quantify the proportion or ratio between the phases. The area of the mossbauer spectrum of any compound is proportional to its concentration. Thus, the integration of each of the spectrum of different compounds present in a sample would yield their weight percentage. The first phase is characterized by a six line spectrum while the second phase is characterized by a doublet spectrum. The mossbauer parameters of these two phases fall in the ranges specified as follows:

| Phase | Magnetic Field H (gauss) | Isomer Shift IS (mms$^{-1}$) | Quadripole Splitting QS (mms$^{-1}$) |
|---|---|---|---|
| First | | | |
| (Oxide) | 350–600 | 0.0–0.5 | 0.0–0.5 |
| (Sulphide) | 150–350 | 0.0–0.6 | 0.0–0.6 |
| Second | | | |
| (Oxide) | 0 | 0.0–2.0 | 0.0–3.0 |
| (Sulphide) | 0 | 0.0–2.0 | 0.0–3.0 |

Examination of spent catalysts by mossbauer spectroscopy reveals that the catalyst acts to store the metal contaminants from the oil. The relative proportion between the two phases serve to control the activity, stability (life) and the selectivity of the catalyst.

The pore size distribution of the catalyst is important only in the sense of permitting a good diffusion of the reactant molecules throughout the catalyst and is preferably as follows.

≦90 Å diameter: between 0–10% pore volume
90–300 Å diameter: between 20–85% pore volume
300–500 Å diameter: between 5–20% pore volume
≧500 Å diameter: between 0–10% pore volume.

A catalyst of the present invention is useful in hydrotreatment operations involving heavy feedstocks. It possesses a good catalytic activity for hydrodemetallization and hydroconversion reactions. The heavy feedstocks to be handled in these operations might be vacuum residues, deasphalted crudes and also heavy vacuum gas oils.

In cases where a presulphided catalyst is desirable, it should be presulphided with a light sulphur containing feed at temperatures in the range of 250° to 450° C. at pressures between 1 and 150 atmospheres of $H_2$. The $H_2/H_2S$ ratio is critical in order to keep the first phase/second phase ratio within the recommended limits. A mixture containing between 5 to 15% of $H_2S$ is adequate. The $H_2S$ is provided for the sulphur compound in the presulphiding feed. Suitable sulphur compounds are $H_2S$, $CS_2$, mercapthans, and/or any organic sulphur compound.

The shape and/or the size of the catalyst is not limiting. It can be used in any shape or size, in a fixed bed reactor, stirred tank and/or slurry. The process operation consists of contacting the feed with the catalyst in the presence of hydrogen under the following conditions: temperature of between 150° to 500° C., preferably 250° to 480° C., pressure of between 30 to 250 atms., preferably 50 to 150 atms., and LHSV ($h^{-1}$) of between 0.1 to 25, preferably 0.1 to 15.

The following examples are given in order to more fully describe, but not to limit, the invention.

EXAMPLE 1

A catalyst was prepared by consecutive impregnation of pellets of $\gamma$-$Al_2O_3$ support. Iron was firstly impregnated using an acid iron nitrate solution containing 1.12 mol. per liter solution of iron. A solution volume of twice the pore volume of the support was employed. The catalyst was then carefully washed, filtered dried and calcined. Molybdenum was impregnated secondly, using an ammonium heptamolybdate solution containing 0.20 mol. per liter solution of molybdenum. A procedure similar to that employed with iron was then followed. The final catalyst had the following physical and chemical properties:

| Physical Properties | |
|---|---|
| Surface Area | 145 $m^2 g^{-1}$ |
| Pore Volume | 0.81 cc $g^{-1}$ |
| Pore Size Distribution Diameter (Å) | % pore volume |
| <90 | 8.5 |
| 90–300 | 62.2 |
| 300–500 | 23.7 |
| >500 | 5.6 |
| Chemical Properties | |
| Fe | 6% w |
| Mo | 2% w |

The catalyst was grounded to a 15 $\mu$m average presulphided at 350° C., 1.2 atmosphere of pressure using a mixture of $H_2/H_2S$ at a ratio of 1:10. The sulphided catalyst was analyzed by x-ray diffraction and mossbauer spectroscopy. The results indicated that two iron compounds were present, namely:

| Hexagonal $Fe_7S_8$ | 40% of total iron |
|---|---|
| Cubic $Fe_xMo_yS_z$ | 60% of total iron |

The mossbauer parameters of these two compounds were measured as follows:

| | Magnetic Field H (gauss) | Isomer Shift IS (mms$^{-1}$) | Quadripole Splitting QS (mms$^{-1}$) |
|---|---|---|---|
| $Fe_7S_8$ (6 lines) | 226–302 | 0.6 | 0.0–0.25 |
| $Fe_xMo_yS_z$ (2 lines) | 0 | 0.3–1.5 | 0.8–2.5 |

The catalytic activity was evaluated in a 3.5 liter autoclave under the following conditions:

| Temperature | 450° C. |
|---|---|
| $H_2$ pressure | 1900 psi |
| $H_2$ flow rate | 16 l min$^{-1}$ |
| Duration | 5 h |
| Catalyst | 8% w |
| Feed | 1000 g |

The feed was a heavy vacuum residue Zuata feedstock having the following properties:

| API gravity | 2.2° |
|---|---|
| Sulphur content | 4.9% |
| Vanadium content | 750 ppm |
| Asphaltenes | 25% w |
| Conradson Carbon | 27% w |

The results of the catalytic activity test are as follows:

| HDM | 98 |
|---|---|
| HDS | 70 |
| Asphaltene Conversion | 95 |
| Conradson Carbon Conversion | 94 |
| API Gravity Variation | 25.2 |

As can be seen from the foregoing, the catalyst of the present invention is extremely effective in the demetallization and hydrogenation of heavy feedstocks.

EXAMPLE 2

The initial activity of the catalyst of Example 1 in pellet form, and a conventional commercial catalyst of CoMo-type having a similar pore size distribution and a Co content of 2.5 %w and Mo content of 12.3 %w were evaluated in a Carberry reactor using the following conditions:

| Temperature | 400° C. |
|---|---|
| $H_2$ pressure | 1500 psi |
| Catalyst | 6% |
| Feed | 600 g |

The feedstock was a deasphalted Morichal having the following properties:

| API gravity | 16.7° |
|---|---|
| Vanadium content | 150 ppm |
| Sulphur content | 2.4% w |
| Asphaltenes | 2.4% w |
| Conradson Carbon | 5.1 |

The two catalysts were subjected to three consecutive runs, (with intermediate xylene washing) and evaluated under the same conditions, in order to determine the final activity of a partially deactivated catalyst. The results are summarized in Table I.

TABLE I
CATALYTIC ACTIVITY OF NOVEL CATALYST AND CONVENTIONAL CATALYST

| Activity | FeMoAl Initial | FeMoAl Final | CoMoAl Initial | CoMoAl Final |
|---|---|---|---|---|
| HDM | 70 | 65 | 90 | 10 |
| HDS | 35 | 15 | 98 | 35 |
| HDC$_{540+}$ | 75 | 100 | 65 | 34 |
| Asphaltene Conversion | 78 | 78 | 92 | 66 |
| Conradson Carbon Conversion | 50 | 61 | 55 | 47 |

As can be seen from Table I the life of the catalyst of the present invention is superior to known catalysts.

EXAMPLE 3

A test was carried out similar to Example 2 above but using three additional feedstocks which consist of the same DAO diluted in light gas oil at different proportions, so as to give the following vanadium contents (ppm):

| Feed 1 | 150 |
|---|---|
| Feed 2 | 100 |
| Feed 3 | 30 |

The vanadium removal (HDM) and the conversion of the 540° C.+ fraction (HDC$_{540}$+) were evaluated, the results were as follows:

| | Feedstocks | | | | | |
|---|---|---|---|---|---|---|
| | 1 | | 2 | | 3 | |
| | FeMo | CoMo | FeMo | CoMo | FeMo | CoMo |
| HDM | | | | | | |
| Initial | 75 | 92 | 78 | 94 | 80 | 95 |
| Final | 73 | 15 | 76 | 45 | 78 | 86 |
| HDC | | | | | | |
| Initial | 85 | 70 | 88 | 75 | 92 | 80 |
| Final | 98 | 55 | 100 | 68 | 100 | 72 |

Again the superiority of the catalyst of the present invention is demonstrated, when metal concentration in the feed is high.

EXAMPLE 4

A series of catalysts were prepared as in Example 1 to yield different first phase/second phase and Fe/Mo ratios. The catalysts were not presulphided. The chemical composition of these catalysts is shown in Table II.

TABLE II

| Catalyst | Fe/Mo | First Phase/Second Phase | First Phase | Second Phase |
|---|---|---|---|---|
| 1 | 35 | 10 | α-Fe$_2$O$_3$ | α-FeMoO$_4$ |
| 2 | 8.0 | 4.5 | α-Fe$_2$O$_3$ | α-FeMoO$_4$ |
| 3 | 3.9 | 2.5 | γ-Fe$_2$O$_3$ | α-FeMoO$_4$ |
| 4 | 2.8 | 1.4 | γ-Fe$_2$O$_3$ | α-FeMoO$_4$ |
| 5 | 2.0 | 0.5 | γ-Fe$_2$O$_3$ | α-FeMoO$_4$ |
| 6 | 0.9 | 0.0 | — | α-FeMoO$_4$ |
| 7 | 0.7 | 0.05 | α-Fe$_2$O$_3$ | α-FeMoO$_4$ |
| 8 | 0.4 | 0.08 | α-Fe$_2$O$_3$ | α-FeMoO$_4$ |
| 9 | 0.3 | 0.15 | α-Fe$_2$O$_3$ | β-FeMoO$_4$ |
| 10 | 0 | No Iron | | |

The catalytic activity and stability was evaluated in the same manner as in Example 2, however, the catalysts were used in the oxide form (as identified in Table II). The results are reported in Table III.

TABLE III

| Catalyst | HDM I | HDM F | HDS I | HDS F | HDC 540+ I | HDC 540+ F | Asphaltene Conversion I | Asphaltene Conversion F | Conradson Carbon Conversion I | Conradson Carbon Conversion F |
|---|---|---|---|---|---|---|---|---|---|---|
| 1 | 10 | 8 | 2 | 2 | 15 | 13 | 10 | 8 | 7 | 8 |
| 2 | 54 | 52 | 18 | 17 | 56 | 54 | 68 | 55 | 25 | 24 |
| 3 | 62 | 58 | 19 | 20 | 65 | 67 | 73 | 62 | 32 | 29 |
| 4 | 68 | 64 | 20 | 19 | 70 | 72 | 75 | 73 | 48 | 46 |
| 5 | 71 | 65 | 24 | 15 | 75 | 100 | 78 | 78 | 50 | 60 |
| 6 | 92 | 38 | 43 | 12 | 88 | 25 | 95 | 42 | 82 | 28 |
| 7 | 90 | 55 | 40 | 16 | 84 | 52 | 92 | 50 | 75 | 36 |
| 8 | 86 | 70 | 39 | 20 | 83 | 61 | 88 | 78 | 70 | 42 |
| 9 | 84 | 73 | 39 | 20 | 80 | 68 | 86 | 65 | 68 | 49 |
| 10 | 86 | 25 | 33 | 12 | 80 | 20 | 88 | 18 | 70 | 20 |

I — Initial
F = Final

Table III demonstrates the criticality of iron-Group VIB metal ratio and the first phase/second phase ratio on hydrodemetallization and hydroconversion.

EXAMPLE 5

Catalyst No. 5 of Example 4 was presulphided at different H$_2$S/H$_2$ ratios. The iron sulphide of the first phase exhibited the following crystal structures.

| No. | H$_2$S/H$_2$ | Crystal System | First Phase |
|---|---|---|---|
| 5-1 | 1:5 | Cubic | Fe$_{1-x}$S |
| 5-2 | 1:10 | Monoclinic | Fe$_y$S$_8$ |
| 5-3 | 1:15 | Hexagonal | Fe$_y$S$_8$ |
| 5-4 | 1:20 | Hexagonal | FeS |
| 5-5 | 1:30 | Tetragonal | FeS |

The initial catalytic activity was measured in the same manner as in Example 2. The results were as follows:

| | HDM | HDS | HDC$_{540+}$ |
|---|---|---|---|
| 5-1 | 72 | 43 | 48 |
| 5-2 | 75 | 28 | 62 |
| 5-3 | 85 | 22 | 39 |
| 5-4 | 50 | 10 | 20 |
| 5-5 | 35 | 8 | 15 |

The foregoing demonstrates the criticality of the crystal structure of the first phase on activity.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A catalyst for use in the hydrodemetallization and hydroconversion of heavy hydrocarbon feedstocks comprising a refractory support having a first demetallization phase and a second hydrogenation phase supported thereon, said first demetallization phase being selected from the group consisting of iron oxide, iron sulphide and mixtures thereof and said second hydrogenation phase being selected from the group consisting of iron-Group VIB metal oxides, iron-Group VIB metal sulphides and mixtures thereof wherein said weight ratio of said first phase to said second phase as measured by mossbauer spectrum is from about 0.1 to 8.0; said iron is present in an amount of from about 4 to 20 wt.% and said Group VIB metal is present in an amount of from about 0.1 to 8 wt.% wherein the atomic ratio of iron to Group VIB metal is from about 0.3 to 20.

2. A catalyst according to claim 1 wherein the iron is present in an amount of from about 4 to 20% and the Group VIB metal is present in an amount of from about 1.0 to 5.0%.

3. A catalyst according to claim 1 wherein said first phase is an iron sulphide having a crystalline structure selected from the group consisting of the cubic system, the hexagonal system, the monoclinic system and mixtures thereof.

4. A catalyst according to claim 1 wherein said first phase contains from about 30 to 85 wt.% of the total iron content of the catalyst.

5. A catalyst according to claim 1 wherein said first phase contains from about 30 to 70 wt.% of the total iron content of the catalyst.

6. A catalyst according to claim 1 wherein the atomic ratio of iron to Group VIB metal is from about 0.6 to 5.0.

7. A catalyst according to claim 1 wherein said second phase contains a crystalline structure of the cubic system and the atomic ratio of iron to Group VIB metal is from about 0.8 to 3.0.

8. A catalyst according to claim 1 wherein the refractory support is selected from the group consisting of alumina, silica, titania and mixtures thereof and has the following pore size distribution:
   $\leq 90$ Å diameter: between 0–10% pore volume
   90–300 Å diameter: between 20–85% pore volume
   300–500 Å diameter: between 5–20% pore volume
   $\geq 500$ Å diameter: between 0–10% pore volume.

9. A method for the preparation of a catalyst for use in the hydrodemetallization and hydroconversion of heavy hydrocarbon feedstocks comprising:
   (a) providing a refractory support structure;
   (b) first impregnating said refractory support structure with an acid iron nitrate solution so as to obtain a composition of from about 4 to 20 wt.% iron on said final catalyst;
   (c) filtering, drying and calcining said impregnated support;
   (d) second impregnating said filtered, dried and calcined support with a solution containing a Group VIB metallic component so as to obtain a composition of from about 0.1 to 8 wt.% Group VIB metallic component on said final catalyst; and
   (e) filtering, drying and calcining said impregnated support.

10. A method according to claim 9 including sulphiding the impregnated support of (e) above.

* * * * *